United States Patent [19]

Alwood et al.

[11] 4,092,195

[45] May 30, 1978

[54] REPAIR OF POLYSTYRENE REFRIGERATOR LINERS

[76] Inventors: Gloria Belle Alwood, 7597 El Terraza Dr., Sacramento, Calif. 95828; George Dimitriadis, 610 Wade Ave., Modesto, Calif. 95351

[21] Appl. No.: 787,706

[22] Filed: Apr. 14, 1977

[51] Int. Cl.$^2$ .............................................. B32B 35/00
[52] U.S. Cl. ................................ 156/94; 260/32.8 R; 260/42.54; 264/36; 427/140
[58] Field of Search ...................... 156/94, 98; 264/36; 260/32.8 R, 42.54; 427/140

[56] References Cited

U.S. PATENT DOCUMENTS

| | | | |
|---|---|---|---|
| 2,628,180 | 2/1953 | Iverson | 156/308 |
| 3,470,048 | 9/1969 | Jones | 156/94 |

*Primary Examiner*—Edward G. Whitby
*Attorney, Agent, or Firm*—J. L. Bohan

[57] ABSTRACT

An improved formulation for repairing breaks and fractures in the plastic inside lining of refrigerators, freezers, and the like, and the method for effecting such repair with the formulation.

7 Claims, No Drawings

ing approximately one-half teaspoon of titanium dioxide to three gallons of the specially formulated coating medium, described above. If volume measuring is not convenient, then a by-weight approach to pigmentation may be accomplished by adding approximately one pound of titanium dioxide to every 50 pounds of polystyrene pellets employed in the formulation of the coating medium. Moreover, the exact amount of tinting can be allowed to vary considerably to permit coloration to the desired degree without detracting from the strength and adhesive properties of the coating formulation. In order to repair a crack or hole in the hard polystyrene liner of the refrigerator, the area in the immediate vicinity of the crack is repaired by first cleaning it carefully and then sanding it lightly. The aforesaid coating formulation of methyl ethyl ketone and polystyrene is then applied over the crack and to the area in the vicinity of the crack by means of a brush or other appropriate means. The coating is then allowed to dry in the air, and once it has hardened, the area is then sanded again. This first coating is normally a clear coating without containing any pigmentation and gives the operator a clear indication is what coverage is being effected by the coating. A second coating likewise of a clear formulation is then applied over the area. While the second coating is still wet, a pre-cut patch of fiberglass surface matting is placed over the coated area. The patched area is then again allowed to air dry until it is sufficiently hard to permit sanding to smooth the surface. At this point, a third coating of the aforesaid formulation is applied to the patched area. Although this last coating may be of a clear formulation, it is usually desired to add the pigmented coating at this stage, and upon air drying, results in an attractive, strong repair.

It has been found that where the fissure in the hard polystyrene liner of the refrigerator or freezer is a crack that a bevelling tool, such as the point of a soft drink can opener, can be run along the crack so as to remove base material and force the edges downwardly towards the insulation. This results in a slight trough which will allow an extra buildup of the coating medium, thereby increasing the thickness of the refrigerator liner at that point. This reinforcing structure will appear along the back side and will not cause any apparent increase in thickness, although the liner is substantially thickened at that point to increase its strength to a point greater than that of the base material. Consequently, the resulting repair invariably does result in a patched area which is of greater strength than the original material.

In addition to effecting repairs after a crack has been created, one can likewise build up the thickness of an area where heavy loads or continued usage is likely to eventually result in a perforation or crack in the liner. In view of the practice in industry to continue to decrease the thickness of the liner, this ability to build up the thickness to a desired level in specified areas, it is of considerable advantage.

When the repair is effected, the foods are always removed from the refrigeration unit so as to avoid contamination by the coating medium. Normally, the repair is effected while the refrigerator is turned off, however, it has been found that in those cases where there is some refrigerator odor that leaving the refrigerator on during repair and closing the door during at least one of the drying stages, will dramatically reduce the undesirable refrigerator odors. Although various fiberglass mattings can be employed, a preferred matting is one which has a normal weave which is slightly coarser than that of

REPAIR OF POLYSTYRENE REFRIGERATOR LINERS

BACKGROUND OF THE INVENTION

In the industry of refrigeration and freezer repair and servicing, one of the most difficult repairs to make is that of mending and restoring the inner wall of refrigerators and freezers which have become cracked, fractured or perforated.

The inside walls of a refrigerator or freezer are commonly made of hardened polystyrene plastics of comparably thin cross-section. Between this inside wall and the outside surface of the refrigerator are placed various insulating materials. However, the thin, polystyrene plastic is frequently cracked or fractured in the course of usage so as to produce an open crack, fissure or hole creating an avenue for moisture from the various foods inside the refrigerator to pass, so as to permeate into the cavity where the insulation is located. After a period of time, the insulation can become so saturated with moisture that the insulating properties are reduced to the point that the refrigeration system runs constantly without maintaining a sufficiently low temperature to preserve the food contents. Invariably, mold and undesirable bacteria develop so as to create an unhealthy invironment for the storage of foods.

A number of methods for repairing these liners have been employed in the past, including tapes, resin, patch kits, and the like. However, these systems create a poor bond with the base material so that areas of non-adhesion or embrittlement occur, or shrinkage arise, or other problems develop allowing avenues for cold air and moisture to reach the insulation cavity. As a consequence, the aforementioned undesirable bacteria buildup and deteriorating insulating properties eventually re-occur. Moreover, the patching systems used in the past have resulted in obvious patchwork that is not esthetically appealing.

The formulation and process of the present invention, however, provide an esthetic, as well as a structurally sound repair that is comparatively simple to perform. The resulting patch frequently produces a repaired area which has strength substantially greater than the surrounding base material. Due to the ease with which the formulation can be pigmented to the desired color, a patch can be made that is extremely difficult to detect.

The present invention relies on the use of a specially formulated liquid coating medium which is applied to the crack in several stages, and incorporates at one point a fiberglass surface matting. The basic ingredients of the coating medium are polystyrene and methyl ethyl ketone. A preferred embodiment of this formulation employs polystyrene granules with sufficient methyl ethyl ketone added thereto to produce a coating medium which is readily applied by the desired coating system. As a general rule, a paint brush works quite effectively for applying the formulation. It has been found that in blending a batch of the coating medium, approximately 1.5 parts by volume of polystyrene granules may be added to approximately 2 parts by volume of methyl ethyl ketone to produce a liquid of the viscosity that can be readily painted onto a surface.

If the refrigerator has a white polystyrene liner, the last coating of material should be appropriately tinted to produce a matching white. It has been found that a generally suitable matching white can be made by addcheese cloth. This usually results in openings of approximately 1/32 of an inch, however, openings of other size can be employed without detracting from the desired results. The polystyrene granules or pellets should be of the high impact or medium impact grade. Either the common grade or virgin grade material can be used.

The aforesaid coating formulation can be packages in a number of ways for individual home repair purposes. For example, it can be packaged to include a small vial of the liquid formulation, along with the fiberglass matting, and brushes or spatulas for application. Small pellets for adding to the formulation to produce various pigmentations can be also included so as to produce a match of the repair to the color of the liner in the refrigeration unit being repaired. It is also possible that a repair kit can be made up to include the formulation in a paste or rod form or even in an aerosol or spray can arrangement.

Although the term "fracture" or "fractured" as used herein has been used in connection with fissures, tears, cracks and the like, the term is also intended to cover larger discontinuities such as perforations and large holes. To repair a large hole the first coating of the mixture is applied to the perimeter of the hole and the fiberglass matting is precut to cover the hole for application after the second coating is applied. Although refrigeration units are readily repaired by this system, it can be used in connection with the repair of other polystyrene articles such as television cases, clock casings, toys and the like.

Although there has been shown and described above the particular embodiments of this invention, it will be obvious to those skilled in the art that various changes and modifications may be made therein without departing from the invention. Accordingly, certain modifications and alterations will occur to those skilled in the art that are included within the scope of the following claims.

We claim:
1. In a method for repairing a fractured liner in a refrigeration unit comprising:
    (a) providing a mixture of methyl ethyl ketone and polystyrene blended so as to form a liquid of sufficient viscosity to permit the coating of said liner without streaking;
    (b) applying one coating of said mixture to the fractured area of the liner;
    (c) allowing the coated area to dry;
    (d) sanding the coating;
    (e) applying a second coating of the said mixture over the first coating;
    (f) placing a pre-cut patch of fiberglass surface matting over the coated area while the second coating is still wet;
    (g) allowing the patched area to dry;
    (h) sand the patched area to a smooth surface;
    (i) apply a third coating of said mixture to the patched area; and
    (j) allow the patched area to dry.
2. A method as in claim 1 wherein the liner is a predetermined color and the mixture used in the third coating contains a pigment to match said predetermined color.
3. A method as in claim 1 wherein the fracture is a crack and the two edges of the crack are forced downwardly so as to create a trough effect, thereby allowing a greater build-up of said mixture in the area of the crack.
4. A method as in claim 1 wherein the refrigeration unit is left running during repair, with food stuffs removed, and the refrigerator door is closed during at least one of the three drying steps.
5. A method as in claim 1 where the liner of the refrigeration unit is treated in an area other than in an area of a crack so as to increase the thickness and wear resistance thereof.
6. In a method for repairing a fractured polystyrene article comprising:
    (a) providing a mixture of methyl ethyl ketone and polystyrene blended so as to form a liquid of sufficient viscosity to permit the coating of said article without streaking;
    (b) applying one coating of said mixture to the fractured area of the article;
    (c) allowing the coated area to dry;
    (d) sanding the coating;
    (e) applying a second coating of the said mixture over the first coating;
    (f) placing a pre-cut patch of fiberglass surface matting over the coated area while the second coating is still wet;
    (g) allowing the patched area to dry;
    (h) sanding the patched area to a smooth surface;
    (i) applying a third coating of said mixture to the patched area; and
    (j) allowing the patched area to dry.
7. A method as in claim 6 wherein the article is treated in an area other than in the area of a fracture so as to increase the thickness and wear resistance thereof.

* * * * *